(12) United States Patent
Weykamp

(10) Patent No.: US 11,072,844 B2
(45) Date of Patent: Jul. 27, 2021

(54) MULTI-STAGE ALUMINUM ALLOY FORMING AND THERMAL PROCESSING METHOD FOR THE PRODUCTION OF VEHICLE COMPONENTS

(71) Applicant: Shape Corp., Grand Haven, MI (US)

(72) Inventor: Helen Weykamp, Grand Haven, MI (US)

(73) Assignee: SHAPE CORP., Kalamazoo, MI (US)

( * ) Notice: Subject to any disclaimer, the term of this patent is extended or adjusted under 35 U.S.C. 154(b) by 683 days.

(21) Appl. No.: 15/791,834

(22) Filed: Oct. 24, 2017

(65) Prior Publication Data

US 2018/0112298 A1 Apr. 26, 2018

Related U.S. Application Data

(60) Provisional application No. 62/412,009, filed on Oct. 24, 2016.

(51) Int. Cl.
| | |
|---|---|
| *C22F 1/053* | (2006.01) |
| *B21B 3/00* | (2006.01) |
| *B23K 26/21* | (2014.01) |
| *B23K 103/10* | (2006.01) |
| *B21B 1/22* | (2006.01) |

(52) U.S. Cl.
CPC ............. *C22F 1/053* (2013.01); *B21B 3/00* (2013.01); *B23K 26/21* (2015.10); *B21B 2001/228* (2013.01); *B21B 2003/001* (2013.01); *B23K 2103/10* (2018.08)

(58) Field of Classification Search
None
See application file for complete search history.

(56) References Cited

U.S. PATENT DOCUMENTS

| | | |
|---|---|---|
| 3,945,861 A | 3/1976 | Anderson et al. |
| 5,383,986 A | 1/1995 | Cho |

(Continued)

FOREIGN PATENT DOCUMENTS

| | | |
|---|---|---|
| AU | 2003244695 A1 | 10/2003 |
| BR | PI0915440 A2 | 11/2015 |

(Continued)

OTHER PUBLICATIONS

Hyunok Kim and Taylan Altan, Warm Forming of Aluminum Alloys, Powerpoint, Oct. 15, 2014, pp. 1-25, EWI Forming Center, Ohio, United States of America.

(Continued)

*Primary Examiner* — Anthony J Zimmer
*Assistant Examiner* — Michael J Kachmarik
(74) *Attorney, Agent, or Firm* — Bodman PLC

(57) ABSTRACT

A method of forming and processing a high strength aluminum alloy for the production of a vehicle component includes providing a metal sheet that was rolled from an aluminum alloy. The sheet is heat treated through a first aging step of a set of aging steps that are necessary to achieve a T6 or a T7 temper state. Prior to achieving the T6 or a T7 temper state, the sheet is formed to a desired shape and welded in the desired shape to produce a desired vehicle component. Once formed, the vehicle component is heat treated through a remaining aging step to achieve a T6 or T7 temper state homogeneously throughout the vehicle component.

19 Claims, 7 Drawing Sheets

(56) References Cited

U.S. PATENT DOCUMENTS

| | | |
|---|---|---|
| 5,393,357 A | 2/1995 | Cho |
| 5,439,536 A | 8/1995 | Cho |
| 5,560,789 A | 10/1996 | Sainfort et al. |
| 6,027,582 A | 2/2000 | Shahani et al. |
| 6,315,842 B1 | 11/2001 | Shahani et al. |
| 6,528,183 B2 | 3/2003 | Dif et al. |
| 6,685,782 B1 | 2/2004 | Schwellinger |
| 6,692,589 B2 | 2/2004 | Warner et al. |
| 6,869,490 B2 | 3/2005 | Cho |
| 7,125,459 B2 | 10/2006 | Cho |
| 7,135,077 B2 | 11/2006 | Warner |
| 7,211,161 B2 | 5/2007 | Pillet et al. |
| 7,229,509 B2 | 6/2007 | Cho |
| 7,252,723 B2 | 8/2007 | Dif et al. |
| 7,452,429 B2 | 11/2008 | Boselli et al. |
| 7,520,945 B2 | 4/2009 | Dumont et al. |
| 7,550,110 B2 | 6/2009 | Warner et al. |
| 7,704,333 B2 | 4/2010 | Cho et al. |
| 7,744,704 B2 | 6/2010 | Bes et al. |
| 7,763,128 B2 | 7/2010 | Heymes et al. |
| 7,776,167 B2 | 8/2010 | Catteau et al. |
| 7,780,802 B2 | 8/2010 | Dif et al. |
| 7,837,808 B2 | 11/2010 | Heymes et al. |
| 7,841,507 B2 | 11/2010 | Kempa et al. |
| 7,862,903 B2 | 1/2011 | Eberl et al. |
| 7,901,522 B2 | 3/2011 | Hollrigl et al. |
| 7,938,165 B2 | 5/2011 | Lequeu et al. |
| 7,993,474 B2 | 8/2011 | Warner et al. |
| 8,211,251 B2 | 7/2012 | Carsley et al. |
| 8,277,580 B2 | 10/2012 | Dangerfield et al. |
| 8,323,425 B2 | 12/2012 | Wang et al. |
| 8,323,426 B2 | 12/2012 | Danielou et al. |
| 8,420,226 B2 | 4/2013 | Ehrstrom et al. |
| 8,469,255 B2 | 6/2013 | Bordesoules et al. |
| 8,771,441 B2 | 7/2014 | Bes et al. |
| 9,254,879 B2 | 2/2016 | Smeyers et al. |
| 9,381,880 B2 | 7/2016 | Matecki et al. |
| 9,555,504 B2 | 1/2017 | Bordesoules-Eberl et al. |
| 9,945,010 B2 | 4/2018 | Danielou et al. |
| 10,065,266 B2 | 9/2018 | Glazebrook et al. |
| 10,144,998 B2 | 12/2018 | Lequeu et al. |
| 2001/0006082 A1 | 7/2001 | Warner et al. |
| 2002/0011289 A1 | 1/2002 | Warner |
| 2002/0031682 A1 | 3/2002 | Dif et al. |
| 2002/0134474 A1 | 9/2002 | Cho |
| 2003/0207141 A1 | 11/2003 | Warner et al. |
| 2003/0219353 A1 | 11/2003 | Warner et al. |
| 2004/0003872 A1 | 1/2004 | Pillet et al. |
| 2004/0056075 A1* | 3/2004 | Gheorghe ............ B23K 20/122 228/199 |
| 2004/0079455 A1 | 4/2004 | Dif et al. |
| 2004/0182483 A1 | 9/2004 | Heymes et al. |
| 2005/0006008 A1 | 1/2005 | Cho |
| 2005/0034794 A1 | 2/2005 | Benedictus et al. |
| 2005/0058568 A1 | 3/2005 | Boselli et al. |
| 2005/0084408 A1 | 4/2005 | Cho et al. |
| 2005/0150578 A1 | 7/2005 | Bes et al. |
| 2005/0167016 A1 | 8/2005 | Dumont et al. |
| 2005/0183802 A1 | 8/2005 | Catteau et al. |
| 2005/0186302 A1 | 8/2005 | Sohn et al. |
| 2005/0189044 A1 | 9/2005 | Benedictus et al. |
| 2005/0189048 A1 | 9/2005 | Cho |
| 2006/0000094 A1 | 1/2006 | Garesche et al. |
| 2006/0016523 A1 | 1/2006 | Dif et al. |
| 2006/0054666 A1* | 3/2006 | Ehrstrom ............ B23K 20/122 228/227 |
| 2006/0118213 A1 | 6/2006 | Eberl et al. |
| 2006/0151075 A1 | 7/2006 | Van Der Veen et al. |
| 2006/0191609 A1 | 8/2006 | Dangerfield et al. |
| 2007/0131313 A1 | 6/2007 | Cho et al. |
| 2007/0181229 A1 | 8/2007 | Bes et al. |
| 2007/0194603 A1 | 8/2007 | Bouet-Griffon et al. |
| 2007/0246137 A1 | 10/2007 | Lequeu et al. |
| 2007/0259200 A1 | 11/2007 | Lequeu et al. |
| 2008/0056932 A1 | 3/2008 | Cho et al. |
| 2008/0210350 A1 | 9/2008 | Warner et al. |
| 2008/0223492 A1 | 9/2008 | Catteau et al. |
| 2008/0236708 A1 | 10/2008 | Heymes et al. |
| 2008/0289728 A1 | 11/2008 | Bes |
| 2009/0191090 A1* | 7/2009 | Making ............... C22C 21/10 420/532 |
| 2009/0223608 A1 | 9/2009 | Hollrigl et al. |
| 2010/0001133 A1 | 1/2010 | Kempa et al. |
| 2010/0037998 A1* | 2/2010 | Bray .................. B64C 3/182 148/690 |
| 2010/0288400 A1 | 11/2010 | Bordesoules et al. |
| 2010/0314007 A1 | 12/2010 | Danielou et al. |
| 2011/0209801 A2 | 9/2011 | Warner et al. |
| 2011/0278397 A1 | 11/2011 | Bes et al. |
| 2012/0138195 A1 | 6/2012 | Philbrook et al. |
| 2012/0152415 A1 | 6/2012 | Danielou et al. |
| 2012/0261036 A1 | 10/2012 | Pouget et al. |
| 2012/0291925 A1 | 11/2012 | Bes et al. |
| 2012/0325381 A1 | 12/2012 | Gasqueres et al. |
| 2013/0009422 A1 | 1/2013 | Bouet-Griffon et al. |
| 2013/0092294 A1 | 4/2013 | Ebert et al. |
| 2013/0248053 A1 | 9/2013 | Bordesoules-Eberl et al. |
| 2013/0269840 A1 | 10/2013 | Danielou et al. |
| 2013/0320685 A1* | 12/2013 | Imamura ............. B60R 19/24 293/155 |
| 2014/0220381 A1 | 8/2014 | Muller et al. |
| 2014/0283958 A1 | 9/2014 | Bes et al. |
| 2015/0069770 A1 | 3/2015 | Hashimoto et al. |
| 2015/0129370 A1 | 5/2015 | Shahani et al. |
| 2015/0255253 A1 | 9/2015 | Van Kappel et al. |
| 2015/0299818 A1 | 10/2015 | Sachdev et al. |
| 2015/0299837 A1 | 10/2015 | Ehrstrom et al. |
| 2015/0376742 A1 | 12/2015 | Matsumoto et al. |
| 2016/0053357 A1 | 2/2016 | Bes et al. |
| 2016/0060741 A1 | 3/2016 | Chevy et al. |
| 2016/0144946 A1 | 5/2016 | Danielou et al. |
| 2016/0222491 A1 | 8/2016 | Aruga et al. |
| 2016/0237531 A1 | 8/2016 | Bes |
| 2016/0237532 A1 | 8/2016 | Danielou et al. |
| 2016/0304994 A1 | 10/2016 | Skubich et al. |
| 2016/0304995 A1 | 10/2016 | Sigli et al. |
| 2016/0355916 A1 | 12/2016 | Danielou et al. |
| 2016/0368588 A1 | 12/2016 | Pignatel et al. |
| 2016/0368589 A1 | 12/2016 | Bayona-Carrillo |
| 2017/0050264 A1 | 2/2017 | Glazebrook et al. |
| 2017/0218487 A1 | 8/2017 | Franklin et al. |
| 2017/0218493 A1 | 8/2017 | Pouget et al. |
| 2017/0292180 A1 | 10/2017 | Pouget et al. |
| 2017/0306454 A1 | 10/2017 | Chevy et al. |
| 2017/0314113 A1 | 11/2017 | Skubich et al. |
| 2018/0171449 A1 | 6/2018 | Skubich et al. |
| 2018/0179621 A1 | 6/2018 | Muller et al. |
| 2018/0202026 A1 | 7/2018 | Dolega et al. |
| 2018/0258517 A1 | 9/2018 | Franklin et al. |

FOREIGN PATENT DOCUMENTS

| | | |
|---|---|---|
| BR | 112015032476 A2 | 7/2017 |
| BR | PI1010800 A2 | 7/2017 |
| BR | 112018003521 A2 | 9/2018 |
| CA | 2730028 A1 | 1/2010 |
| CA | 2760015 A1 | 11/2010 |
| CA | 2507820 C | 9/2011 |
| CA | 2916525 A1 | 12/2014 |
| CA | 2923109 A1 | 4/2015 |
| CA | 2941193 A1 | 9/2015 |
| CA | 2997667 A1 | 3/2017 |
| CA | 3001252 A1 | 4/2017 |
| CN | 101076613 A | 11/2007 |
| CN | 102112263 A | 6/2011 |
| CN | 102421563 A | 4/2012 |
| CN | 105339125 A | 2/2016 |
| CN | 108136730 A | 6/2018 |
| CN | 106170573 B | 12/2018 |
| EP | 1567685 A2 | 8/2005 |
| EP | 1158068 B1 | 4/2009 |
| EP | 2429752 A1 | 3/2012 |
| EP | 1544315 B1 | 8/2012 |
| EP | 2664687 B1 | 7/2015 |

(56) References Cited

FOREIGN PATENT DOCUMENTS

| EP | 1838891 B1 | 12/2015 |
|---|---|---|
| EP | 2049696 B1 | 3/2016 |
| EP | 3013514 A2 | 5/2016 |
| EP | 3052669 A1 | 8/2016 |
| EP | 3114245 A1 | 1/2017 |
| EP | 2318171 B1 | 9/2017 |
| EP | 3362282 A1 | 8/2018 |
| EP | 2652163 B1 | 9/2018 |
| EP | 3080317 B1 | 9/2018 |
| EP | 3394305 A1 | 10/2018 |
| FR | 2879217 A1 | 6/2006 |
| FR | 2945464 A1 | 11/2010 |
| FR | 3011252 A1 | 4/2015 |
| JP | 04783019 B2 | 9/2011 |
| KR | 20070015962 A | 2/2007 |
| KR | 20080103300 A | 11/2008 |
| KR | 20150030118 A | 3/2015 |
| KR | 20160077244 A | 7/2016 |
| RU | 2016127921 A | 1/2018 |
| WO | WO-9811267 A1 | 3/1998 |
| WO | WO-2004053180 A2 | 6/2004 |
| WO | WO-2006064113 A1 | 6/2006 |
| WO | WO-2010003595 A1 | 1/2010 |
| WO | WO-2010049445 A1 | 5/2010 |
| WO | WO-2010130887 A1 | 11/2010 |
| WO | WO-2014207564 A2 | 12/2014 |
| WO | WO-2015044538 A1 | 4/2015 |
| WO | WO-2015112799 A1 | 7/2015 |
| WO | WO-2015131992 A1 | 9/2015 |
| WO | WO-2017044471 A1 | 3/2017 |
| WO | WO-2017064396 A1 | 4/2017 |
| WO | WO-2019007817 A1 | 1/2019 |

OTHER PUBLICATIONS

International Searching Authority, International Search Report and Written Opinion for Application No. PCT/IB2017/056598, dated Feb. 20, 2018.

Lincoln Electric, Common Design Mistakes in Aluminum, Webpage, United States, http://www.lincolnelectric.com/en-us/support/welding-how-to/pages/aluminum-design-mistakes-detail.aspx.

Frank Armao, Aluminum Workshop: Weldable and unweldable aluminum alloys, online publication, May 11, 2011, Practical Welding Today, United States, http://www.thefabricator.com/article/aluminumwelding/weldable-and-unweldable-aluminum-alloys.

Lincoln Electric, Aluminum Welding Frequently Asked Questions, Webpage, United States, http://www.incolnelectric.com/en-us/support/welding-solutions/pages/aluminum-faqs-detail.aspx.

The Aluminum Association, Rolling Aluminum: From the Mine Through the Mill, Publication, 2007, pp. 1-135, Third Edition, United States.

S. V. Emani et al. "Double aging and thermomechanical heat treatment of AA7075 aluminum alloy extrusions," Dec. 1, 2009, 8 pages.

Mori et al. "Improvement of product strength and formability in stamping of Al—Mg—Si alloy sheets having bake hardenability by resistance heat and artificial aging treatments," Nov. 15, 2005, 6 pages.

* cited by examiner

MULTI-STAGE ALUMINUM ALLOY FORMING AND THERMAL PROCESSING METHOD FOR THE PRODUCTION OF VEHICLE COMPONENTS

CROSS-REFERENCE TO RELATED APPLICATION

This application claims benefit and priority under 35 U.S.C. § 119(e) of U.S. provisional application Ser. No. 62/412,009, filed Oct. 24, 2016, which is hereby incorporated herein by reference in its entirety.

FIELD OF THE INVENTION

The present invention generally relates to forming and thermal processing techniques for aluminum alloys, and more particularly to multi-stage aging processes for high strength aluminum alloys used for forming vehicle components.

BACKGROUND OF THE INVENTION

In some circumstances, it can be desirable for aluminum alloys to undergo heat treatment or artificial aging for the aluminum alloy to be tempered to the desired material properties, such as the desired material strength. However, secondary operations, such as cutting or welding, that are done after an aluminum alloy component is heat treated/artificially aged can compromise the material properties at the site of the secondary operation, potentially making the component susceptible to corrosion. Further, it is generally known that aluminum alloys can be subject to internal stresses after localized heat generating operations, such as convection welding, whereby certain aluminum alloys can be more susceptible to distortions and cracking after these operations. Accordingly, it is common for vehicle components made from some aluminum alloys, such as 7000 series aluminum alloys, to not be formed with welding operations and to use adhesives and/or mechanical fasteners, such as rivets or screws, instead of welding.

SUMMARY OF THE PRESENT INVENTION

The present invention provides a system or method of forming and processing an aluminum alloy for the production of a component, such as a beam component for a vehicle. The method may provide an aluminum wrought product, such as a sheet or plate or extrusion. The wrought product may be heat treated through a first aging step of a set of aging steps that are necessary to achieve a desired temper state, such as T6 or T7 temper. These initial processing steps of forming the aluminum alloy into the wrought product and initial heat treatment of the wrought product may be performed at a first location or facility, such as at a metal manufacture or mill. Prior to achieving the desired temper state, the wrought product may be transported or delivered to a second location or facility, where the wrought product is formed to a desired shape and welded in the desired shape to produce a desired component. The component is then heat treated through a remaining aging step to achieve the desired temper state, such as T6 or T7 temper, generally homogeneously throughout the component. In the final temper state after heat treatment, the aluminum alloy component is less susceptible to corrosion and has consistent material strength. Thus, in accordance with the present invention, the heat treatment or aging process to achieve the T6 or T7 temper state is separated into at least two steps to allow the wrought product to be processed, such as via welding, between these steps and thereby avoid excessive heat treatment, which can avoid added time and cost for unnecessary heat treatment operations.

According to one aspect of the present invention, a method is provided for forming and processing an aluminum wrought product for the production of a component. The method includes providing a wrought product that comprises an aluminum alloy. The wrought product has been heat treated through a first aging step of a plurality of aging steps necessary to achieve a final temper state. The wrought product is processed to provide a component having a desired shape. The processed component is heat treated through a remaining aging step of the plurality of aging steps to achieve the final temper state.

According to another aspect of the present invention, a method is provided for forming and processing an aluminum wrought product for the production of a vehicle component. An aluminum alloy is rolled to form a sheet product having a W temper state. The sheet product is heat treated through a first aging step of a plurality of aging steps that are necessary for the sheet product to achieve a T6 or a T7 temper state. The sheet product is formed to a desired shape, and then welded in the desired shape to provide a vehicle component. The vehicle component is heat treated through a remaining aging step of the plurality of aging steps to achieve a T6 or a T7 temper state homogeneously throughout the vehicle component.

According to yet another aspect of the present invention, a method is provided for forming and processing a high strength aluminum alloy for the production of a metal component. The method includes providing a sheet that comprising a 7000 series aluminum alloy, such as a 7075 and a 7085 aluminum alloy, where the sheet has been heat treated through a first aging step of a plurality of aging steps necessary to achieve a T6 or a T7 temper state. The sheet is then formed to a desired shape and/or welded to the desired configuration to provide a metal component. The metal component is then heat treated through the remaining aging step or steps of the plurality of aging steps to achieve a T6 or T7 temper state homogeneously throughout the metal component. The first aging step may include heat treating the sheet for approximately 5 to 6 hours at around 100 degrees Celsius, while the remaining aging step or steps may include heat treating the metal component for approximately 10 to 18 hours at around 150 degrees Celsius. The welding of the sheet may optionally include laser welding with a wire to create a geometrically and metallurgically sound weld.

These and other objects, advantages, purposes, and features of the present invention will become apparent upon review of the following specification in conjunction with the drawings.

DETAILED DESCRIPTION OF EMBODIMENTS

Figure 1:
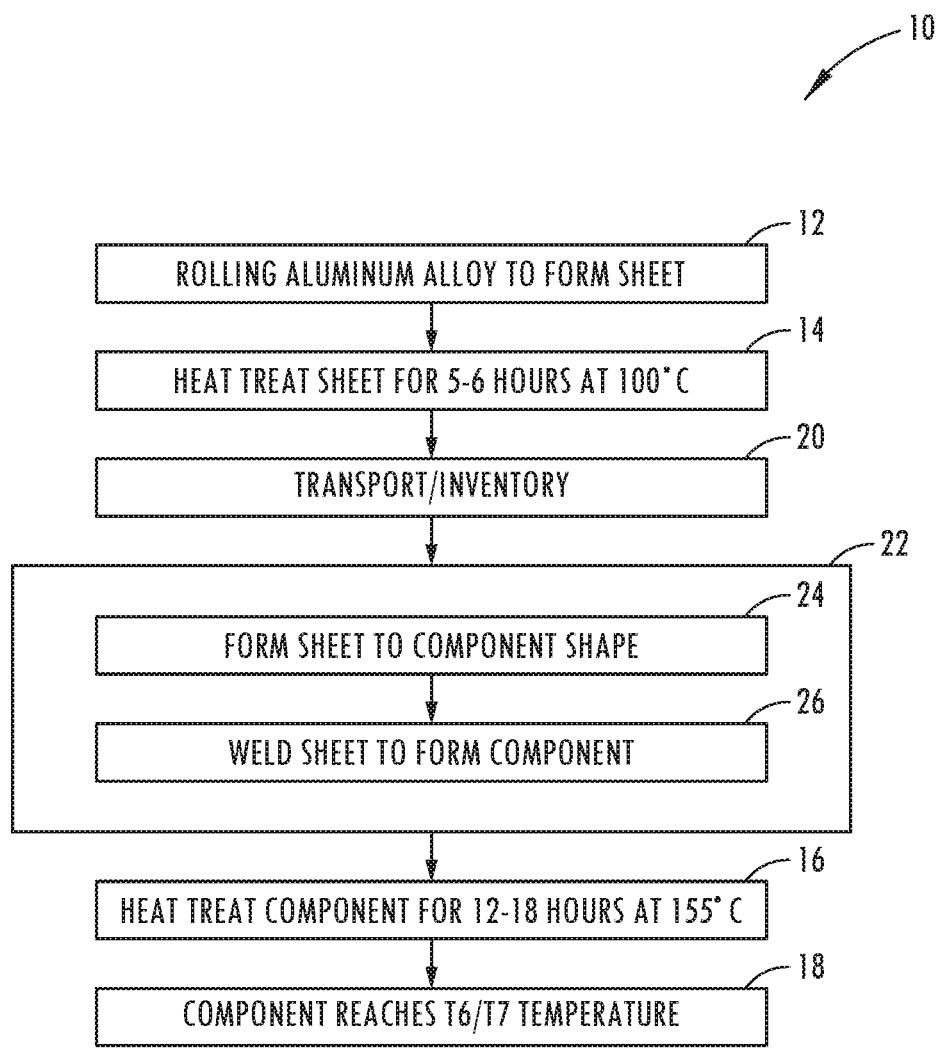
FIG. 1 is a process flow chart that illustrates a method of forming and processing an aluminum alloy, in accordance with the present invention.
Figure 6:
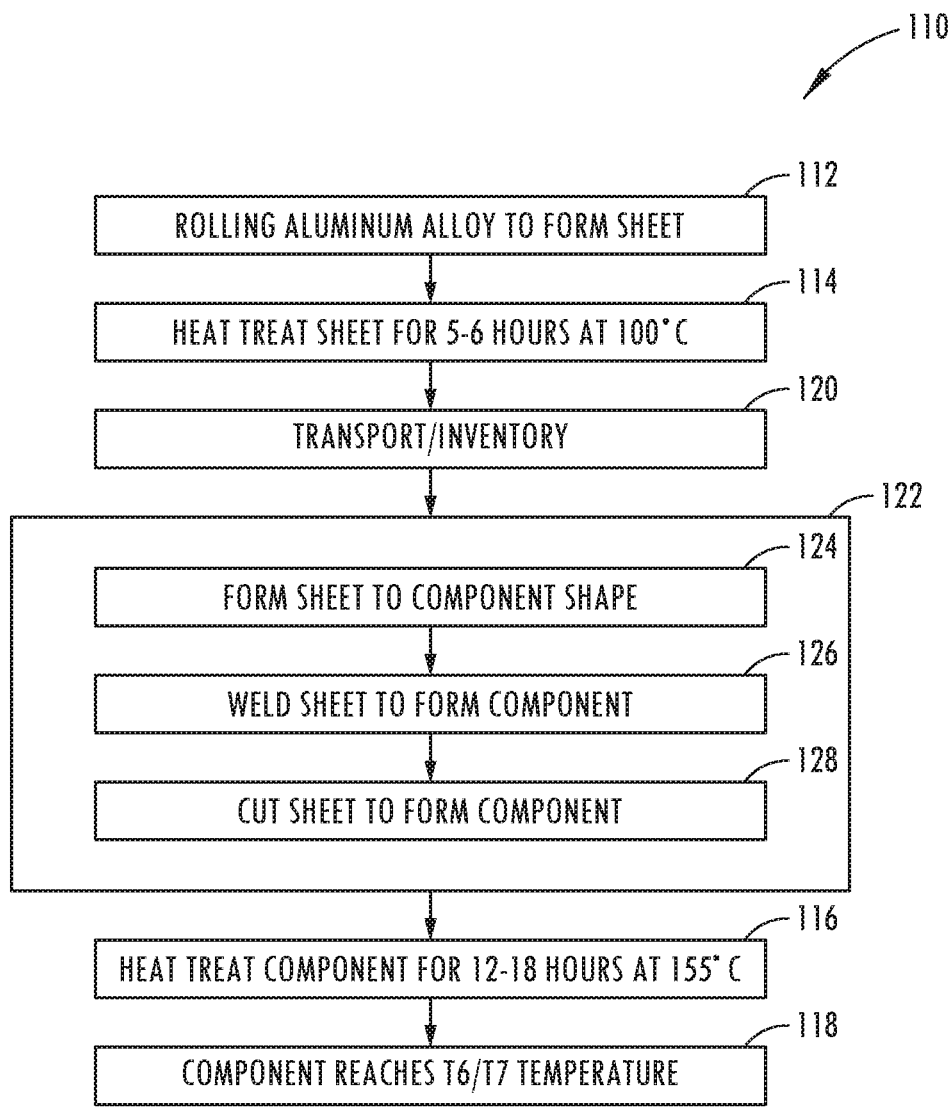
FIG. 6 is a process flow chart that illustrates an additional embodiment of a method of forming and processing an aluminum alloy.
Figure 11:
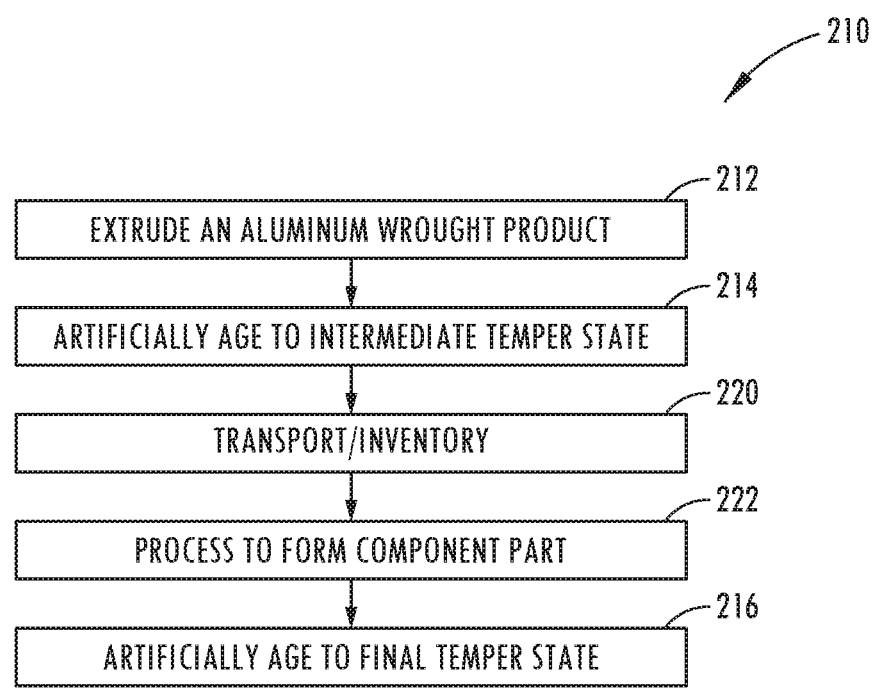
FIG. 11 is a process flow chart that illustrates an additional embodiment of a method of forming and processing a high strength aluminum alloy.

Referring now to the drawings and the illustrative embodiments depicted therein, systems and methods 10, 110, 210, such as shown respectively in FIGS. 1, 6, 11, are provided for forming and processing an aluminum alloy for the production of a component, such as processing a high strength aluminum alloy to form a vehicle component, such as a reinforcement beam for impact energy management, a structural beam for vehicle frame construction, or other like vehicle components. In general, aging a solutionized metal, such as an aluminum alloy, can strengthen the alloy by causing the alloying elements to form intermetallic particles that can act as a reinforcing phase, thereby increasing the strength of the alloy. Aluminum alloys that are solution heat treatable include 2000, 6000, and 7000 series aluminum alloys (also referred to as 2xxx, 6xxx, and 7xxx series alloys), such as, for example, 7003, 7046A, 7075 and 7085 alloys. These aluminum alloys may be processed by first rolling or extruding the metal alloy into a wrought product at W temper, such as shown at steps 12, 112, 212 in FIGS. 1, 6, and 11. At this state of W temper, the aluminum alloy of the wrought product may be susceptible, and in some environments extremely susceptible, to corrosion and/or spontaneous or natural aging at room temperature after solution heat treatment. In order to prevent this corrosion and natural aging, the wrought product in the W temper state may be artificially aged with heat treatment.

Artificial aging, or simply referred to as aging, may cause precipitates to form at elevated temperatures, and may be done in two or more steps in order to stabilize the aluminum alloys to a T6 or T7 temper. The steps may include initially aging a wrought product in an oven or other heated environment for around 5-6 hours at approximately 100 degrees Celsius to stabilize the microstructure, such as shown at steps 14, 114, 214 in FIGS. 1, 6, and 11. This initial aging prevents susceptibility to corrosion in comparison to the W temper state, and allows the wrought product to gain the desired amount of strength during the remaining or subsequent steps of aging. The multi-stage aging process may subsequently include a process step that artificially ages the wrought product at an increased temperature of an oven or heated environment to approximately 130 to 190 degrees Celsius, such as around 150 degrees Celsius, for approximately 10-18 hours, such as shown at steps 16, 116, 216 in FIGS. 1, 6, and 11. Preferably the subsequent artificial aging of the wrought product is done between 140 and 160 degrees Celsius, and more preferably between 148 to 158 degrees Celsius, and yet more preferably at approximately 155 degrees Celsius. At both of these separate aging steps of the process, the temperatures and times of aging may be greater or less than those provided to account for variances in other environmental or material conditions and still be within the scope of the present invention.

Thus, upon artificially aging the component through the remaining or subsequent aging steps, this multi-stage aging process for aluminum alloys produces a metal piece that has a T6 or T7 temper state that is stable and provides the desired mechanical properties of the component, such as shown at steps 18, 118, 218 in FIGS. 1, 6, and 11. Although these initial and subsequent aging steps can be done in immediate succession and in the same oven, the present invention involves separating these aging steps in time and/or location to allow for additional processing, such as cutting, welding, forming (such as roll forming or stamping) and the like, to be performed between the initial and subsequent steps of aging, thereby reducing or otherwise preventing corrosion from post-aging cutting, welding, and forming and reducing or otherwise preventing distortion from internal stresses after heating operations. As used herein, wrought product broadly refers to aluminum that is rolled to a thickness, such as a sheet (with a thickness generally between 0.2 mm and 6.3 mm) than or plate (with a thickness generally greater than 6.3 mm), or otherwise aluminum that is extruded from a die to a desired cross-sectional shape.

Figure 2A:
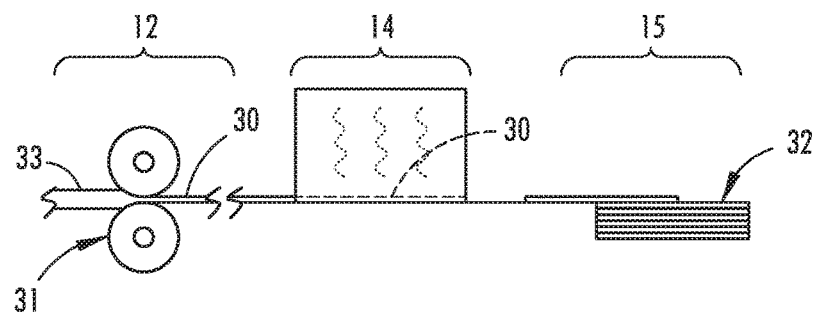
FIG. 2A is a schematic side elevational view of a rolling process that forms and artificially ages an aluminum sheet.

With reference to FIG. 1, the initial steps of the multi-stage process 10 include forming an aluminum alloy into a wrought product, namely a sheet 30, by rolling the aluminum alloy, so as to form the sheet 30 in a W temper state, such as shown at step 12. This rolling step 12 is also illustrated in FIG. 2A, whereby the sheet 30 exits a rolling mill 31 as a result of the rolling mill compressing and stretching the aluminum stock 33 that feeds into the rolling mill 31. The aluminum sheet 30 may then be heat treated through a first aging step at step 14, such as at approximately 100 degrees Celsius for approximately 5 to 6 hours, or otherwise at a temperature and duration not sufficient for the wrought product to achieve a T6 or T7 temper state. The first aging step 14 is also shown in FIG. 2A with the sheet 30 located in a heated environment, such as an oven. These initial processing steps 12, 14 may be performed at a first location or facility, such as a metal manufacture or mill.

Figure 2B:
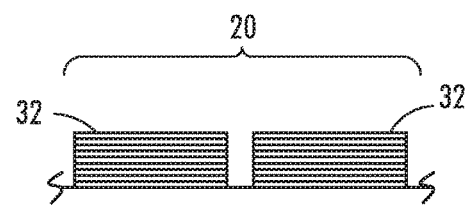
FIG. 2B is a schematic side elevational view of an inventory staging step that shows the aluminum sheet stored in stacks.

Upon performing the initial heat treatment at step 14, and prior to the metal sheet achieving the T6 or T7 temper state, the sheet 30 may be stored in inventory or delivered or transported to a second location or facility, such as shown at step 20 in FIG. 1. Prior to or after the first aging step 14, the sheet 30 may be cut into generally rectangular shapes and stacked in flat form stacks 32, such as shown at step 15 in FIG. 2A. The sheet 30, such as in the stacked form 32 shown in FIG. 2B, may be stored at room temperature in inventory or transported for some time, such as, for example, up to approximately 30 days, without generally undergoing harmful corrosion or distortion. The heat and duration of the first aging step 14 causes the initial heat treatment or aging of the sheet 30 at step 14 to provide such protective characteristics to the wrought product for this inventory and transportation period. The sheet may preferably include a 7000 series aluminum alloy, and more preferably may include a 7075 aluminum alloy or a 7085 aluminum alloy; however, it is completed that the multi-stage aging and forming method of the present invention may be done with other metal types and alloys.

Figure 2C:
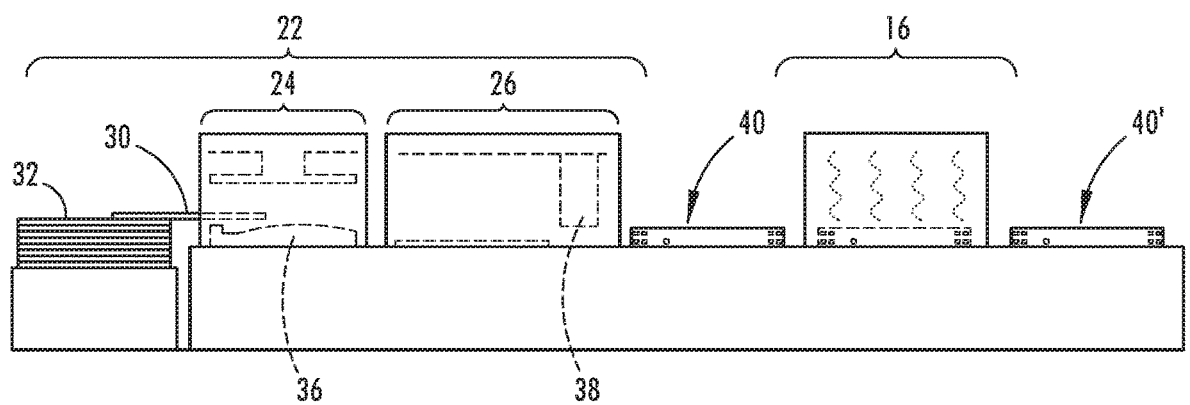
FIG. 2C is a schematic side elevational view of a forming process that cuts and welds the aluminum sheet to form a vehicle component.

At the subsequent processing steps, such as at the second location or a later time, the sheet may undergo various processing steps 22, such as shown in FIGS. 1 and 2C. These processing steps 22 may include one or more steps, such as forming 24 and welding 26, to produce the desired piece or vehicle component. For example, 7075 and 7085 aluminum alloys may be welded with advanced welding processes, which allows the sheet to be welded to create geometrically and metallurgically sound welds, generally free of solidification cracking. Optionally, the welding may be done by MIG welding with a wire, or induction welding, or contact welding or the like. The parameters that are tuned for forming the weld include adjusting laser travel speed, wire feed speed, laser angle, and laser power. It is conceivable that in additional embodiments, the welding of the sheet after the initial heat treatment at step 14, such as at the various processing steps 22, may optionally include laser welding, friction stir welding, or the like. It is contemplated that during the processing steps 22, the sheet may be welded, whereby the localized heat from the welding may cause the portion or heat affect zone of the sheet being welded to return to the W temper state.

Figure 3:
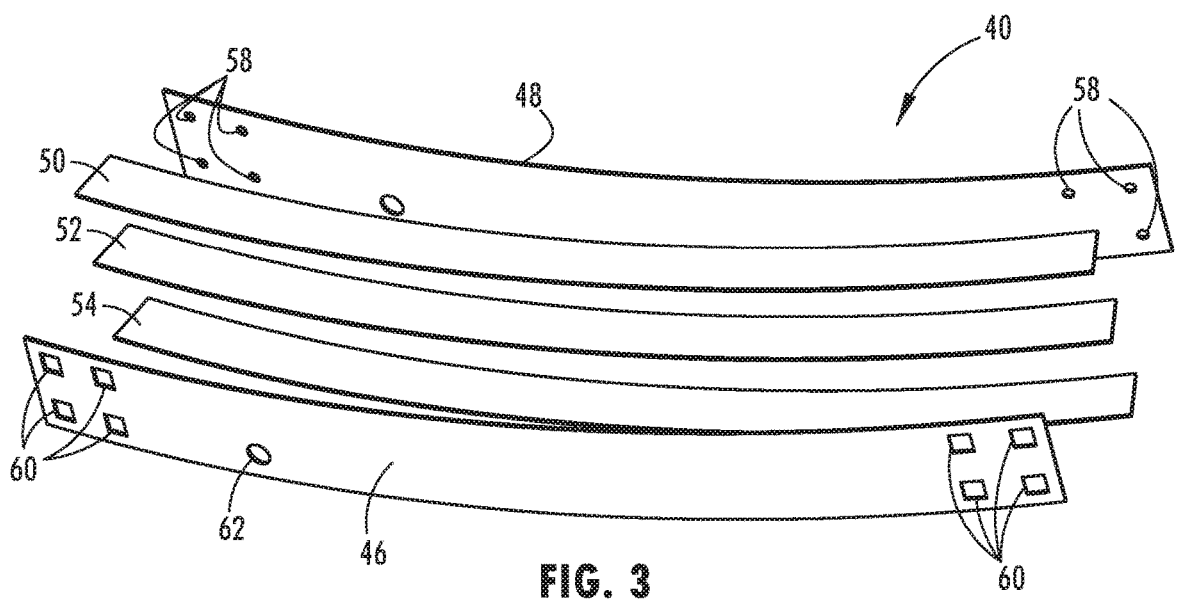
FIG. 3 is an exploded upper perspective view of a beam component formed with the process shown in FIG. 2C.
Figure 4:
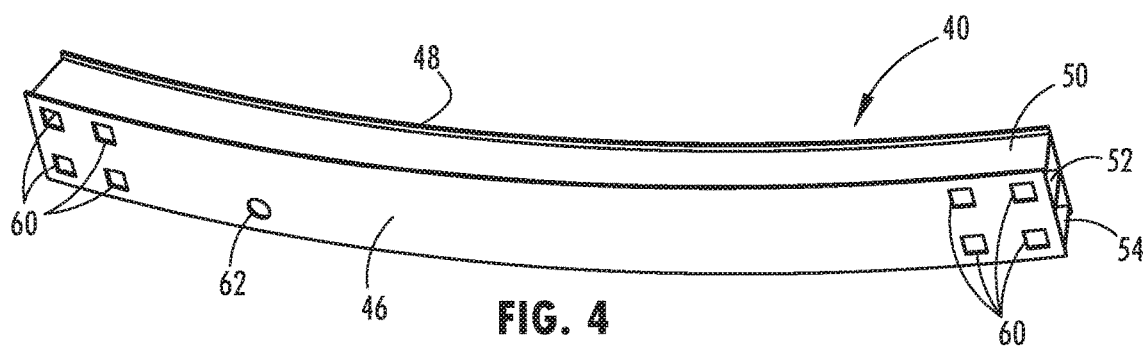
FIG. 4 is an upper perspective view of the beam component shown in FIG. 3.
Figure 5:
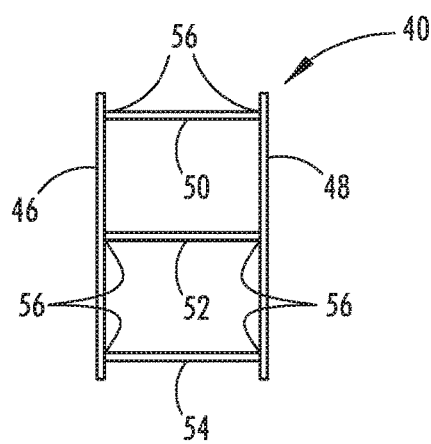
FIG. 5 is a cross-sectional view of the beam component shown in FIG. 4.

As shown, for example, in FIG. 2C, multiple processing steps 22 are illustrated being performed on a metal sheet 30, such as a sheet of aluminum alloy that has been heat treated through the initial processing steps 12, 14 shown in FIG. 1. The steps shown in FIG. 2C include individual sheets 30 being removed from a stack of sheets 32 of aluminum to be fed horizontally in-line into a stamping die 36, which may be configured to cut, bend, and/or impart different shapes into the sheet 30 to form pieces or strips of the sheet, each with a desired shape. The pieces or strips may then be fed into a welding station 38 that attaches the pieces or strips together to form a component 40, such as a beam component having at least one enclosed area. A welder in the welding station 38 may weld and fix the pieces of the sheet 30 in the desired shape, such as to weld the pieces of the sheet 30 held in a fixture by welding an edge portion of the pieces to other pieces of the sheet to provide a component 40, such as with an enclosed tubular shape as shown in FIGS. 3-5. The pieces may also be bent or curved, such that upon attaching the pieces or strips together, the resulting component may include an overall curved shape, such a desired longitudinal curvature that conforms to an aerodynamic shape of a portion of the vehicle where the component attaches, such as curved shape that corresponds with a vehicle door, vehicle bumper or other conceivable area of a vehicle.

As shown in FIGS. 3-5, the component 40 is a beam that is made from five sheets or strips of aluminum, including strips forming its front wall 46, rear wall 48, top horizontal shear wall 50, intermediate horizontal shear wall 52, and bottom horizontal shear wall 54. The shear walls 50-54 are generally planar, but are pre-formed to have non-linear front and rear edges. The front and rear walls 46, 48 matingly engage and are secured to the edges by continuous welds, such as welds located at the six non-radiused corners 56 (FIG. 5) formed when orthogonally-related sheets abut. The front and rear walls 46, 48 may be pre-formed, such as at the forming step 24, to include attachment holes 58 in the rear wall 48 and access holes 60 in the front wall 46, and any other features desired such as an accessory mounting hole 62. It is contemplated that the front and rear walls 46, 48 or other walls can also be pre-formed and can be non-planar or planar but sufficiently flexible to take on the shape of the edges when biased into engagement by the welding fixture. It is also contemplated that the formed beam can, for example, have thicker sheets forming the front wall and the rear wall, and thinner sheets forming the shear walls, as further described in U.S. Pat. No. 9,381,880, the disclosure of which is hereby incorporated herein by reference in its entirety.

Referring again to FIG. 2C, upon leaving the welding station 38, the formed component 40 may be heat treated through the remaining aging step 16 of the multiple aging steps to achieve the T6 or T7 temper state generally homogeneously throughout the vehicle component 40'. Thus, the additional aging step 16 at least provides more homogeneous material properties and reduces or eliminates the corrosion concerns that would normally exist after welding an aluminum alloy having a T6 temper. In the final temper state after heat treatment, the aluminum alloy vehicle component 40' is generally less susceptible to corrosion and has a more consistent material strength. Thus, the full heat treatment or aging process to achieve the T6 or a T7 temper state is separated into at least two steps, such as steps 14 and 16, to allow the sheet to be welded between these steps and thereby avoid excessive heat treatment, which, in addition to the additional time and cost of unnecessary heat treatment, can distort the geometry of the component and cause weld failure over time. It is also contemplated that once the T6 or T7 temper state is achieved, the component may be further heat treated, such as the result of a powder coating paint bake. Thus, it is conceivable that the final temper state, prior to the paint bake operation, would account for the subsequent heat treatment the component will undergo to prevent unnecessary heat treatment.

Figure 7A:
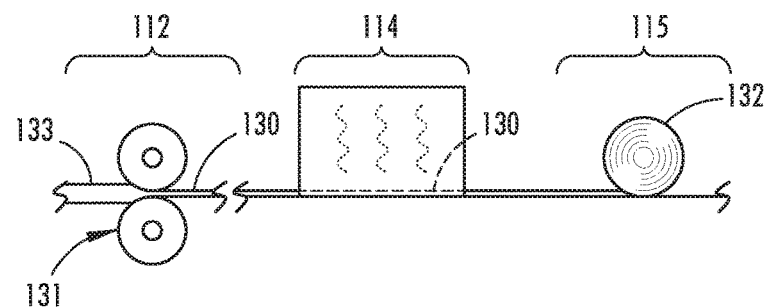
FIG. 7A is a schematic side elevational view of a rolling process that forms and artificially ages an aluminum sheet.

With reference to FIG. 6, an additional embodiment of the multi-stage process 110 includes forming an aluminum alloy into a wrought product, namely a sheet 130. The sheet 130 is formed in a W temper state, such as shown at step 112, as also illustrated in FIG. 7A, whereby the sheet 130 exits a rolling mill 131 that processes aluminum stock 133 fed into the mill 131. Similar to the embodiment shown in FIG. 1, the aluminum sheet 130 may then be heat treated through a first aging step at step 114, such as at approximately 100 degrees Celsius for approximately 5 to 6 hours, or otherwise at a temperature and duration not sufficient for the wrought product to achieve a T6 or T7 temper state. Upon performing the initial heat treatment at step 114, the sheet 130 may be stored in inventory or delivered or transported to a second location or facility, such as shown at step 120 in FIG. 6.

Figure 7B:
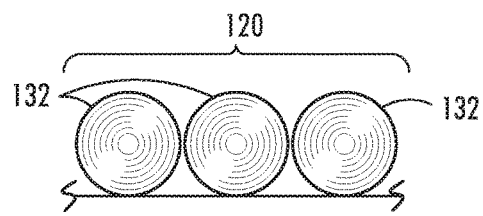
FIG. 7B is a schematic side elevational view of an inventory staging step that shows the aluminum sheet stored in coils.

Prior to or after the first aging step 114, the sheet 130 may be rolled into a coil 132, such as shown at step 115 in FIG. 7A. Multiple coils 132, as shown in FIG. 7B, may be stored at room temperature in inventory or transported for some time, such as, for example, up to approximately 30 days, without generally undergoing harmful corrosion or distortion, due to the applied heat and duration of the first aging step 114. As shown, for example, in FIG. 7C, multiple processing steps 122 are illustrated being performed on an aluminum sheet 130. The steps shown in FIGS. 6 and 7C include the sheet 130 unrolling from a stock rolled coil 132 to be fed horizontally in-line into a roll former, such as the illustrated roller former having a first set of rollers 134' and a second set of rollers 134", each configured to impart different shapes into the sheet 30 to form a desired shape, which may be a beam having at least one enclosed area.

Upon exiting the roll former, a welder 136 may be provided to weld and fix the sheet 130 in the desired shape, such as to weld the sheet 130 by welding a lateral edge portion of the sheet to another portion of the sheet along a length of the sheet to enclose the at least one tubular shape. It is also contemplated that the desired shape may be different cross-sectional shape that do not weld the edge portion of the sheet or may weld both lateral edge portions of the sheet.

Figure 7C:
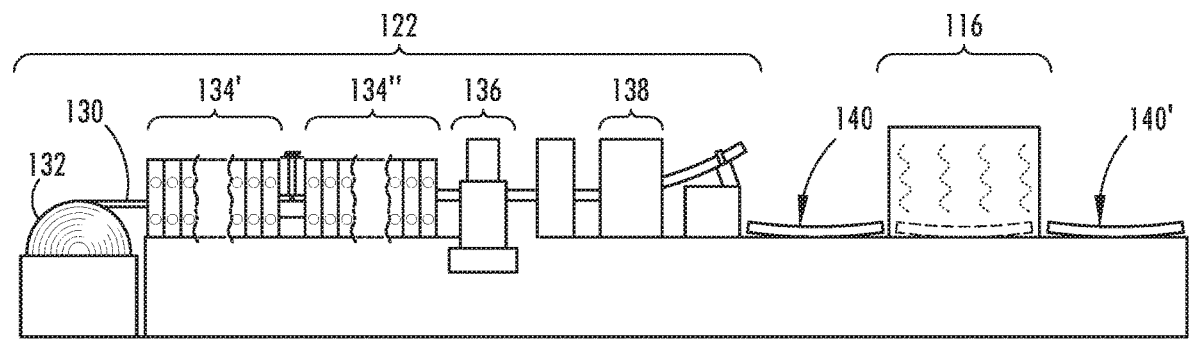
FIG. 7C is a schematic side elevational view of a roll forming process with a roll former, sweeping station, and cutoff station that receive the sheet and form a beam component.
Figure 8:
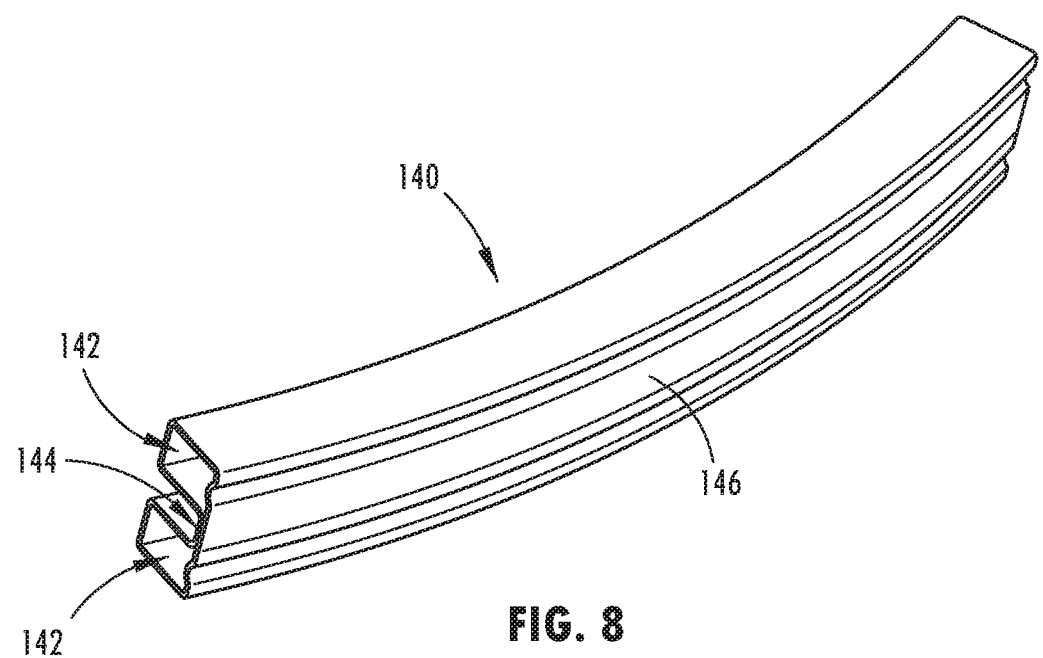
FIG. 8 is an upper perspective view of the beam component formed with the process shown in FIG. 7C.
Figure 9:
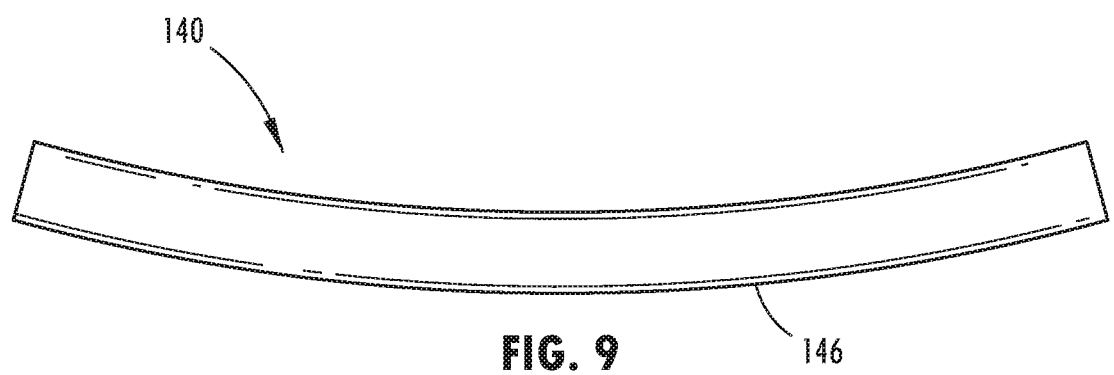
FIG. 9 is a top plan view of the beam component shown in FIG. 8.
Figure 10:
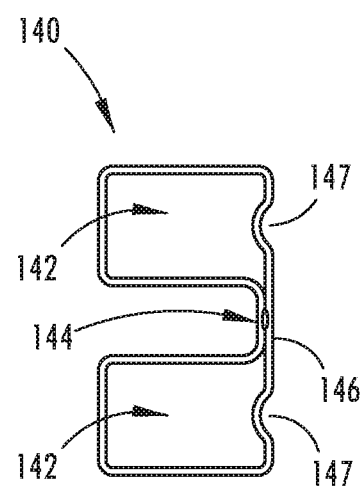
FIG. 10 is a cross-sectional view of the beam component shown in FIG. 8.

Upon leaving the welding station 136, the welded tubular shape can then be bent or swept by a sweeping station 138, such as shown in FIG. 7C, to a desired curvature, such as to conform to an aerodynamic shape of a vehicle bumper or bumper area. The continuous beam or curved profile may also be cut to sectional lengths to provide multiple pieces, which may each define a component, such as a structural frame member, an energy absorption member, or the like for a vehicle or other use. For instance, the formed vehicle component 140 may be configured to provide a vehicle reinforcement beam, such as shown in FIGS. 8-10, whereby the length and curvature of the enclosed beam may be adapted to the front or rear curvature design of a vehicle bumper and the cross-sectional shape of the beam may be adapted to the desired energy absorption characteristics. As shown in FIG. 10, the component 140 is roll formed to provide a generally consistent cross-sectional shape along its length and two enclosed tubular sections 142 with the opposing lateral edges 144 of the sheet 130 bent to attach at a rear surface of the front wall 146. The component 140 may also include channels or stiffening ribs 147 that are formed along the front wall 146 for improved stiffness and strength.

Referring again to FIGS. 6 and 7C, during the processing steps 122, the sheet 130 may be welded to form a geometrically and metallurgically sound weld along the component 140, whereby the localized heat from the welding may cause the portion or heat affect zone of the sheet being welded to return to the W temper state. The formed component 140 may then be heat treated through the remaining aging step 116 of the multiple aging steps to achieve the T6 or T7 temper state generally homogeneously throughout the vehicle component 140', whereby the additional aging step 116 at least provides more homogeneous material properties and reduces or eliminates the corrosion concerns that would normally exist after welding an aluminum alloy having a T6 temper. In the final temper state after heat treatment, the aluminum alloy component is generally less susceptible to corrosion and has a more consistent material strength. Thus, the full heat treatment or aging process to achieve the T6 or a T7 temper state is separated into at least two steps, such as steps 114 and 116, to allow the sheet to be welded between these steps and thereby avoid excessive heat treatment, which, in addition to the additional time and cost of unnecessary heat treatment, can distort the geometry of the component and cause weld failure over time.

With reference to FIG. 11, an additional embodiment of the multi-stage process 210 includes forming an aluminum alloy into a wrought product, namely an extrusion. The extrusion is formed in a W temper state, such as shown at step 212, whereby the extrusion exits an extrusion die that processes aluminum stock. Similar to the embodiment described above, the aluminum extrusion 230 may then be artificially aged or heat treated through a first aging step at step 214, such as to achieve an intermediate temper state or otherwise age for a heat and/or duration that is not sufficient for the wrought product to achieve a final temper state, such as a T6 or T7 temper. Upon performing the initial heat treatment at step 214, the extrusion may be stored in inventory or delivered or transported to a second location or facility, such as shown at step 220. Once taken out of inventory or when transported to the next stage, the wrought product may be processed to from a component part, such as shown at step 222 in FIG. 11. It is contemplated that the component part may be various types or shapes of components, such as for vehicle or furniture construction, among other contemplated uses. The formed component may, as shown in FIG. 11, be heat treated through the remaining aging step 216 to achieve the final temper state, such as generally homogeneously throughout the component 40.

With respect to the general method or formation steps discussed herein, they may be performed in various different sequences from those discussed to similarly result in forming the desired component or beam or portion thereof.

When used herein, the temper designation for aluminum alloys is understood as follows. W temper applies only to alloys that age spontaneously after solution heat treating, while T temper applies to products that are thermally treated, with or without supplementary strain hardening, to produce stable tempers states. The T temper is always followed by one or more digits, such as T6, which designates an alloy being solution treated, then artificially aged: T6 temper applies to products that (a) are not cold worked after solution treatment or (b) for which the effect of cold work in flattening or straightening may not be recognized in mechanical property limits. T7 temper designates an alloy that is solution heat treated and overaged/stabilized: T7 temper applies to (a) wrought products that are artificially aged after solution heat treating to increase their strength beyond the maximum value achievable to provide control of some significant property or characteristic or (b) cast products that are artificially aged after solution treatment to provide stability in dimensions and in strength.

Also for purposes of this disclosure, the terms "upper," "lower," "right," "left," "rear," "front," "vertical," "horizontal," and derivatives thereof shall relate to the invention as oriented in FIG. 5. However, it is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method of forming and processing an aluminum wrought product for the production of a component, said method comprising:

provided a wrought product comprising an aluminum alloy sheet, wherein the aluminum alloy sheet has been heat treated through a first aging step of a plurality of aging steps necessary to achieve a final temper state, the first aging step bringing the aluminum alloy sheet to an intermediate temper state;

forming the aluminum alloy sheet by stamping or roll forming in a forming station to form the aluminum alloy sheet to a desired shape;

welding the aluminum alloy sheet in the desired shape with a fusion welding process in a welding station following the forming station without any processing steps between the forming station and the welding station to provide a component; and heat treating the component through a remaining aging step of the plurality of aging steps to achieve the final temper state.

2. The method of claim 1, wherein the first aging step comprises heat treating the wrought product for 5 to 6 hours at 100 degrees Celsius.

3. The method of claim 1, wherein the remaining aging step comprises heat treating the processed component for 10 to 18 hours above 130 degrees Celsius.

4. The method of claim 1, wherein heat treating the component through the remaining aging step provides the final temper state homogeneously throughout the component.

5. The method of claim 1, wherein the forming station comprises a set of rollers that roll form the aluminum alloy sheet by successively imparting deformation in the aluminum alloy sheet to form a beam.

6. The method of claim 5, wherein the desired shape includes the beam having two enclosed tubular shapes.

7. The method of claim 5, wherein the aluminum alloy sheet is fed into the forming station and sequentially into the welding station to be welded to fix the beam in a consistent cross-sectional shape along its length.

8. The method of claim 1, wherein an edge portion of the aluminum alloy sheet is welded to another portion of the aluminum alloy sheet to fix the aluminum alloy sheet in a tubular shape.

9. The method of claim 1, wherein the final temper state comprises a T6 temper state or a T7 temper state.

10. The method of claim 1, wherein the wrought product comprises a 7xxx series aluminum alloy.

11. The method of claim 1, wherein, prior to the wrought product being heat treated through the first aging step, the wrought product is rolled to form the aluminum alloy sheet.

12. The method of claim 1, wherein the component comprises a reinforcement beam for a vehicle.

13. A method of forming and processing an aluminum wrought product for the production of a vehicle component, said method comprising:

rolling an aluminum alloy to form a sheet;

solution heat treat the sheet to provide a W temper state;

heat treating the sheet through a first aging step of a plurality of aging steps that are necessary for the sheet to achieve a T6 or a T7 temper state;

roll forming the sheet with a roll former to successively bend the sheet to a desired beam shape;

welding the sheet in the desired beam shape with a welder following the roll former without any processing steps between the roll former and the welder to provide a vehicle component; and heat treating the vehicle component through a remaining aging step of the plurality of aging steps to achieve a T6 or a T7 temper state homogeneously throughout the vehicle component, wherein by roll forming and welding before the remaining aging step, the vehicle component is less susceptible to stress corrosion cracking than such a component formed and fusion welded form a sheet in a T6 or T7 temper state.

14. The method of claim 13, wherein the sheet comprises a 7xxx series aluminum alloy.

15. The method of claim 13, wherein the first aging step includes heat treating the sheet at 100 degrees Celsius.

16. The method of claim 13, wherein the remaining aging step includes heat treating the vehicle component between 130 and 190 degrees Celsius until the vehicle component reaches a T6 or a T7 temper state.

17. The method of claim 13, wherein welding the sheet includes welding an edge portion of the sheet to another portion of the sheet along a length of the sheet to enclose a tubular shape in forming the vehicle component.

18. The method of claim 17, wherein forming the sheet includes roll forming the sheet to form a reinforcement beam having at least one enclosed area.

19. The method of claim 17, wherein welding the sheet causes an area at a welded portion of the sheet to achieve a W temper state, and wherein the area at the welded portion achieves a T6 or a T7 temper state upon heat treating the vehicle component through the remaining aging step.

* * * * *